US012810158B1

(12) United States Patent
Anthony et al.

(10) Patent No.: US 12,810,158 B1
(45) Date of Patent: Nov. 24, 2026

(54) CONFIDENCE CALIBRATION BASED ON TOKEN LOGITS

(71) Applicant: Intuit Inc., Mountain View, CA (US)

(72) Inventors: Peter Caton Anthony, Menlo Park, CA (US); Kyle Brown, San Diego, CA (US); Hui Chen, San Jose, CA (US); Peter Lee Frick, San Fracisco, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/274,466

(22) Filed: Jul. 18, 2025

(51) Int. Cl.
*G06N 3/08* (2023.01)

(52) U.S. Cl.
CPC .................................... *G06N 3/08* (2013.01)

(58) Field of Classification Search
None
See application file for complete search history.

(56) References Cited

U.S. PATENT DOCUMENTS

2020/0250480 A1* 8/2020 Qian .................. G06F 18/2148
2025/0265414 A1* 8/2025 Sharpe .................. G06N 3/045
2025/0285348 A1* 9/2025 Cantrell ................ G06F 40/279
2025/0291559 A1* 9/2025 Lu .......................... G06F 40/40
2025/0307598 A1* 10/2025 Trudeau ............... G06N 3/0455
2025/0371417 A1* 12/2025 Cantu .................... G06N 20/00

OTHER PUBLICATIONS

Guo, Chuan, et al. "On calibration of modern neural networks." International conference on machine learning. PMLR, 2017.

* cited by examiner

*Primary Examiner* — Ryan C Vaughn
(74) *Attorney, Agent, or Firm* — Paradice & Li LLP

(57) ABSTRACT

Systems and methods for classifying an accuracy of a language model's (LM's) output are disclosed herein. An example method is performed by one or more processors of a computing system. The example method may include receiving, over a communications network from a computing device, a transmission including a sequence of one or more output tokens from an LM, each respective output token in the sequence of output tokens associated with a corresponding array of logits. The example method may include generating a set of logit metrics for the sequence of output tokens based on the arrays of logits. The example method may include predicting, using a trained confidence model, whether the sequence of output tokens is accurate based on the set of logit metrics.

20 Claims, 6 Drawing Sheets

600

400

600

CONFIDENCE CALIBRATION BASED ON TOKEN LOGITS

TECHNICAL FIELD

This disclosure relates generally to classifying an accuracy of a language model's (LM's) output, and specifically to training and/or using a trained confidence model to predict whether a sequence of output tokens is accurate based on token logits.

DESCRIPTION OF RELATED ART

Language models (LMs) refer to machine-learned systems that process and generate text by predicting sequences of tokens selected from a predefined vocabulary. In practice, an LM receives one or more input tokens and propagates them through multiple transformer layers. Within each layer, the model applies self-attention and feed-forward operations in conjunction with the model's learned token embeddings to generate logits for potential next tokens. These logits are then converted (e.g., via a softmax function) into probabilities that guide the LM in predicting one or more output tokens. The output tokens may be concatenated together to form the LM's final output value (or "sequence").

However, because LMs are prone to generating incorrect or nonsensical outputs (i.e., "hallucinating"), downstream applications that rely on the LM's output are at risk of propagating errors and misinformation, making harmful or costly decisions, and losing user trust and credibility. Accordingly, there is a need to quantify the reliability of the LM's output. For example, an accurate measure of confidence can inform users when to trust the model's predictions and/or enable automated systems to defer uncertain cases to alternative processing pipelines.

A variety of techniques have been used to render confidence scores for model predictions. One common approach is to compute the softmax of the model's logits to obtain nominal probabilities. Some other techniques have included evaluating the model's output as a whole, such as based on an extent to which the output aligns with a desired format.

While such methods have provided useful representations of output confidence, further improvements are desired. For example, softmax-derived probabilities are often overly optimistic (e.g., clustering near 1) even when the model is prone to error, and thus fail to represent a true frequency with which an LM's output is correct. Accordingly, there remains a significant need for well-calibrated confidence scores that more accurately and more meaningfully convey the likelihood of correctness for each prediction.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter described in this disclosure can be implemented as a method for classifying an accuracy of a language model's (LM's) output. An example method is performed by one or more processors of a computing system. The example method can include receiving, over a communications network from a computing device, a transmission including a sequence of one or more output tokens from an LM, each respective output token in the sequence of output tokens associated with a corresponding array of logits. The example method can include generating a set of logit metrics for the sequence of output tokens based on the arrays of logits. The example method can include predicting, using a trained confidence model, whether the sequence of output tokens is accurate based on the set of logit metrics.

Another innovative aspect of the subject matter described in this disclosure can be implemented in a computing system for classifying an accuracy of an LM's output. An example system includes one or more processors and at least one memory coupled to the one or more processors and storing instructions that, when executed by the one or more processors, cause the system to perform operations. The operations can include receiving, over a communications network from a computing device, a transmission including a sequence of one or more output tokens from an LM, each respective output token in the sequence of output tokens associated with a corresponding array of logits. The operations can include generating a set of logit metrics for the sequence of output tokens based on the arrays of logits. The operations can include predicting, using a trained confidence model, whether the sequence of output tokens is accurate based on the set of logit metrics.

Another innovative aspect of the subject matter described in this disclosure can be implemented as a non-transitory computer-readable medium storing instructions that, when executed by one or more processors of a system for classifying an accuracy of an LM's output, cause the system to perform operations. The operations can include receiving, over a communications network from a computing device, a transmission including a sequence of one or more output tokens from an LM, each respective output token in the sequence of output tokens associated with a corresponding array of logits. The operations can include generating a set of logit metrics for the sequence of output tokens based on the arrays of logits. The operations can include predicting, using a trained confidence model, whether the sequence of output tokens is accurate based on the set of logit metrics.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like numbers reference like elements throughout the drawings and specification.

DETAILED DESCRIPTION

Figure 1:
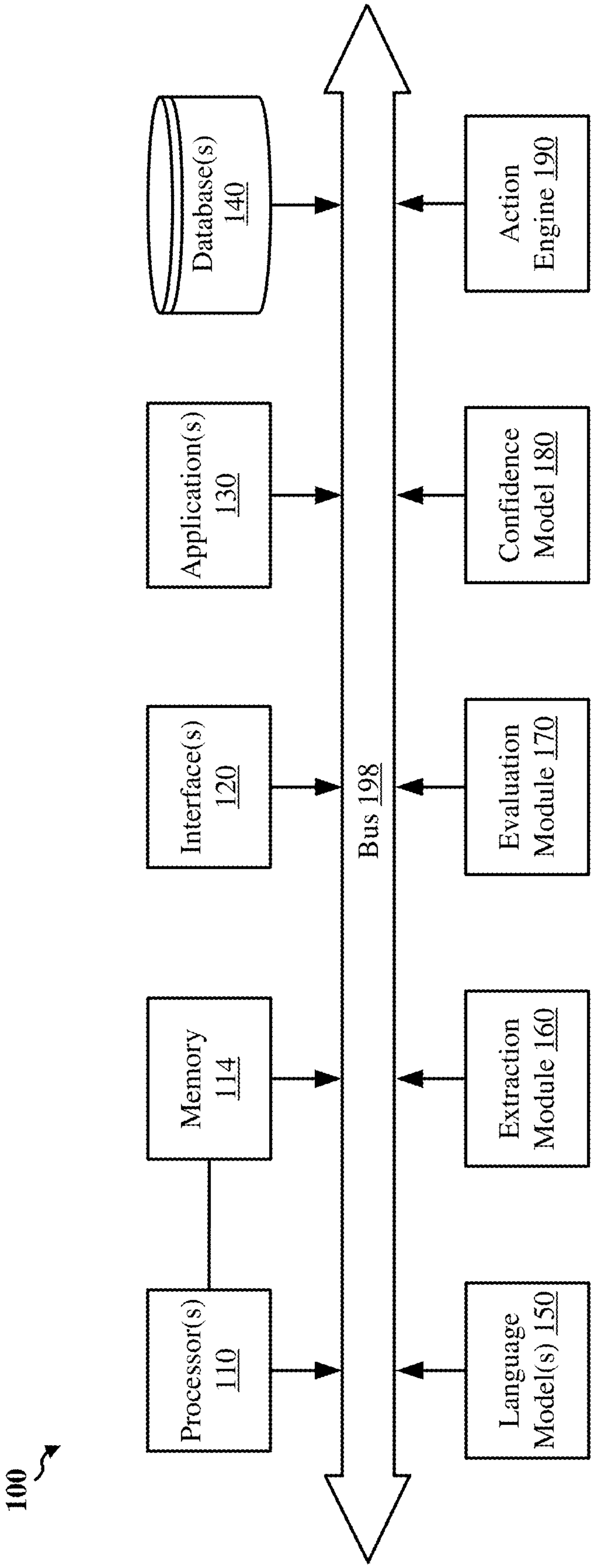
FIG. 1 shows an example computing system, according to some implementations.

In conventional LMs, each output token is typically represented as an array of logits, which are log-probabilities corresponding to the model's vocabulary. The position of the maximum logit in this array determines the predicted token (e.g., one or more characters), and the predicted token's nominal probability is generally computed as the softmax of the maximum logit with respect to the entire array. However, as mentioned above, these nominal probabilities have been shown to be overly optimistic, often clustering near 1 even when the output tokens are incorrect. A significant limitation of existing approaches is that they discard the rich information contained in the arrays of logits once the predicted tokens are generated. In contrast, aspects of the present disclosure recognize that the distributions of logits (e.g., the absolute and relative levels of the logit values, and gaps among them) can provide valuable insights into the accuracy of the output sequence. For instance, when the maximum logit of a generated token is relatively low or separated from the next highest logit by a small gap, it may indicate lower confidence in the correctness of that token.

To address the need for more accurate confidence metrics, aspects of the present disclosure provide innovative systems and methods for training and/or using a trained confidence model to predict whether a sequence of output tokens is accurate based on the arrays of logits corresponding to the output tokens. In some implementations, features such as the number of aggregated tokens, the highest and lowest maximum logits among these tokens, and the largest and smallest gaps between the maximum logit for each token and the next highest logit are computed and used to train the confidence model. The present disclosure contemplates a wide range of techniques for featurizing the distributions of logits to predict accuracy.

The confidence model can be trained using a dataset comprising sequences of output tokens, their corresponding arrays of logits, and ground truth values. By comparing the predicted sequence with a ground truth value associated with the predicted sequence, a binary label indicating accuracy is generated, and features are aggregated across tokens to train the model. Experimental results have shown that the confidence scores produced by this approach are better calibrated (e.g., lower expected calibration error) than nominal token probabilities or simple aggregations thereof. Moreover, as a classifier, the model separates correct output values from incorrect ones more effectively than nominal token probabilities, as measured by receiver operating characteristic area under the curve (ROC AUC).

The various systems and methods disclosed herein classify the accuracy of an LM's output, such as by receiving a sequence of output tokens from an LM along with the arrays of logits corresponding to the output tokens, generating a set of logit metrics for the sequence of output tokens based on these arrays of logits, and using a trained confidence model to predict whether the sequence of output tokens is accurate based on the set of logit metrics. The LM may be a type of generative artificial intelligence (AI) model that outputs strings of text formed by concatenating tokens. Each logit in the array of logits may represent a value indicating the likelihood that a corresponding candidate token (e.g., one or more characters) is the best next token for the sequence of output tokens. The LM may be hosted in conjunction with the computing system, and the arrays of logits may be retrieved directly from a final transformation layer of the LM during generation of the sequence of output tokens. The set of logit metrics may include various features, such as token metrics based on maximum logits or gaps between maximum and second-highest logits, as well as sequence features that indicate characteristics of the entire sequence of output tokens. These sequence features can include aggregated values, trends, and other metrics, as further described below. To make a prediction about accuracy, the system may generate a confidence score for the sequence of output tokens based on the logit metrics and compare it to a threshold. A user interface may be adjusted based on the prediction. To train the confidence model, a dataset of training sequences and their corresponding ground truth sequences may be obtained. The logit metrics may be generated for each token in each training sequence, aggregated into sequence features, and used to generate binary labels indicating accuracy. These labels and sequence features may then be used to train the confidence model using machine learning (ML) techniques.

The systems and methods disclosed herein provide several technical benefits over conventional solutions for evaluating the accuracy of LMs. For example, by leveraging logit distributions to predict accuracy, the system improves calibration and reduces expected calibration error, enabling more reliable confidence scores. As another example, by extracting features such as maximum logit trends and gap trends from logit arrays, the system captures nuanced information about model uncertainty and provides a more comprehensive understanding of output sequence accuracy. Furthermore, the systems and methods disclosed herein can be deployed in a variety of domains, such as healthcare and medical diagnostics (e.g., assessing the confidence of symptom interpretation, treatment recommendations, or triage advice generated by LMs), legal and regulatory compliance (e.g., flagging low-confidence contract clauses, case-law summaries, or statutory interpretations that require human review), financial services and risk analysis (e.g., quantifying confidence in market-trend summaries, earnings-forecast narratives, or automated investment recommendations), scientific research and technical writing (e.g., validating literature reviews, experimental protocols, or data-analysis summaries before publication), education and tutoring systems (e.g., ensuring that explanations, worked examples, and quiz feedback provided by an LM meet a calibrated confidence threshold), customer support and chatbots (e.g., routing low-confidence answers back to human agents or augmenting them with disclaimers when the model's certainty is below a safe threshold), content moderation and compliance (e.g., identifying potentially inaccurate or policy-violating content for moderation), software development and code generation (e.g., highlighting sections of auto-generated code or documentation where the model's self-reported confidence is low to prompt review), and document classification and extraction (e.g., classifying the accuracy of each extracted element so that downstream users or systems can review low confidence items due to, for example, poorly scanned text).

Aspects of the present disclosure address the technical problem of inaccurate confidence assessments for LM output sequences, which can lead to unreliable and potentially erroneous results. This problem arises from the limitations of conventional approaches that discard rich information contained in arrays of logits once predicted tokens are generated. Aspects of the present disclosure recognize that logit distributions provide valuable insights into accuracy and solve this technical problem by providing innovative systems and methods for training and/or using a trained confidence model to predict whether a sequence of output tokens is accurate based on the arrays of logits corresponding to the output tokens. In particular, the Specification and claims describe a method of classifying the accuracy of an LM's output sequence, which includes receiving a sequence of output tokens from an LM along with the arrays of logits corresponding to the output tokens; generating a set of logit metrics for the sequence of output tokens based on these arrays of logits; and using a trained confidence model to predict whether the sequence of output tokens is accurate based on the set of logit metrics. Aspects of the present disclosure provide many practical applications by solving a problem rooted in computer technology, specifically improving calibration and reducing expected calibration error, thereby enabling more reliable confidence scores for various domains, as described above.

Furthermore, aspects of the subject matter disclosed herein are not an abstract idea, such as a mere mental process that can be performed solely by the human mind. For example, while a human may attempt to manually evaluate the accuracy of LM output sequences or estimate confidence levels based on limited information, a human cannot feasibly analyze complex logit distributions across thousands of tokens and sequence positions in real-time, nor can a human capture nuanced trends and patterns indicative of model uncertainty with high precision. The present disclosure leverages sophisticated computational techniques (e.g., training ML models to extract features from arrays of logits, computing confidence scores based on these features, and continuously updating predictions using advanced statistical models) that achieve results far beyond human capability, thereby providing a technical solution to the problem of inaccurate confidence assessments for LM output sequences.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the aspects of the disclosure. However, it will be apparent to one skilled in the art that these specific details may not be required to practice the example implementations. In other instances, well-known circuits and devices are shown in block diagram form to avoid obscuring the present disclosure. Some portions of the detailed descriptions which follow are presented in terms of procedures, logic blocks, processing, and other symbolic representations of operations on data bits within a computer memory.

FIG. 1 shows an example computing system 100, according to some implementations. Various aspects of the computing system 100 disclosed herein are generally applicable for classifying an accuracy of a language model's (LM's) output. The computing system 100 includes a combination of one or more processors 110, a memory 114 coupled to the one or more processors 110, one or more interfaces 120, one or more applications 130, one or more databases 140, one or more LMs 150, an extraction module 160, an evaluation module 170, a confidence model 180, and/or an action engine 190. In some implementations, the various components of the computing system 100 are interconnected by at least a data bus 198. In some other implementations, the various components of the computing system 100 are interconnected using other suitable signal routing resources. In some implementations, the computing system 100 does not include one or more components illustrated in FIG. 1. For example, in a training-specific implementation, the computing system 100 may not include at least one of the interface 120, the application 130, or the action engine 190. Furthermore, in various implementations, the computing system 100 may receive output from or have access to, but not directly include, the LM 150.

The processor 110 includes one or more suitable processors capable of executing scripts or instructions of one or more software programs stored in the computing system 100, such as within the memory 114. In some implementations, the processor 110 includes a general-purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In some implementations, the processor 110 includes a combination of computing devices, such as a combination of a DSP and a microprocessor, a plurality of microprocessors, one or more microprocessors in conjunction with a DSP core, or any other suitable configuration. In some implementations, the processor 110 incorporates one or more hardware accelerators for processing a large amount of data and/or one or more artificial intelligence (AI) accelerators for accelerating AI and machine learning (ML)-based operations, such as one or more graphics processing units (GPUs), one or more tensor processing units (TPUs), one or more neural processing units (NPUs), a wafer-scale integration (WSI) architecture, or the like. For example, the processor 110 may use hardware-based TPUs to process and/or adjust millions, billions, or trillions of artificial neural network (ANN) parameters within seconds, milliseconds, or microseconds.

The memory 114, which may be any suitable persistent memory (such as non-volatile memory or non-transitory memory) may store any number of software programs, executable instructions, machine code, algorithms, and the like that can be executed by the processor 110 to perform one or more corresponding operations or functions. In some implementations, hardwired circuitry is used in place of, or in combination with, software instructions to implement aspects of the disclosure. As such, implementations of the subject matter disclosed herein are not limited to any specific combination of hardware circuitry and/or software.

One or more input/output (I/O) interfaces (e.g., the interface 120) may be used for transmitting or receiving (e.g., over a communications network, such as the Internet or an intranet) transmissions, input data, and/or instructions to or from a computing device (e.g., associated with a user of the system 100), outputting data (e.g., over the communications network) to the computing device, or the like. The interface 120 may also be used to provide or receive other suitable information, such as computer code for updating one or more programs stored on the computing system 100, internet protocol requests and results, or the like. An example interface includes a wired interface or wireless interface to the Internet or other means to communicably couple with user devices or any other suitable devices. In an example, the interface 120 includes an interface with an ethernet cable to a modem, which is used to communicate with an internet service provider (ISP) directing traffic to and from user devices and/or other parties. In some implementations, the interface 120 is also used to communicate with another device within the network to which the computing system 100 is coupled, such as a smartphone, a tablet, a personal computer, or other suitable electronic device. In various implementations, the interface 120 includes a display, a speaker, a mouse, a keyboard, or other suitable input or output elements that allow interfacing with the computing system 100 by a local user or moderator.

The one or more applications 130 may each include one or more interconnected modules or components that interact with each other to perform one or more functions or tasks, such as providing a desired functionality to a user that interacts with the application 130 via the interface 120. An example desired functionality may include classifying an accuracy of an LM's output in real-time with receiving a sequence of tokens (e.g., output from the LM 150) at the computing system 100. In various implementations, the one or more applications 130 integrate aspects of ML, deep learning (DL), or AI to provide predictive capabilities, personalized recommendations, decision-making automation, or the like. In various implementations, the one or more applications 130 may have a monolithic architecture, a microservices architecture including a plurality of services coupled via one or more application programming interfaces (APIs), and/or a distributed architecture across a plurality of processes and/or machines and network protocols. In various implementations, the one or more applications 130 may integrate with one or more external systems or services (e.g., via APIs) to enable the one or more applications 130 to interact with one or more third-party gateways, services, or platforms. In various implementations, the one or more applications 130 may be deployed on a variety of hardware platforms, mobile devices, embedded systems, or cloud servers, and may incorporate one or more CPUs, GPUs, TPUs, FPGAS, sensors, or other specialized hardware and/or AI-based accelerators designed to optimize performance for deep learning (DL) tasks. Some non-limiting example application tasks may include data processing, data analytics, fraud detection, transaction analysis, model simulation, static communication, real-time communication, collaboration, project management, entertainment, streaming, gaming, or any other suitable application task. In various implementations, the application may be developed based on a variety of programming languages and frameworks, such as Python™, Node.js™, Java™, React.js™, Angular™, Flutter™, or another suitable language or framework. In various implementations, the one or more applications 130 are hosted on a cloud platform (e.g., Amazon Web Services™ (AWS™) or Azure™) and/or an on-premise infrastructure (e.g., the database 140). In various implementations, the one or more applications 130 incorporate one or more security mechanisms, such as an authentication mechanism (e.g., multi-factor authentication (MFA)), data encryption (e.g., in transit and at rest), audit logging, an AI firewall, or the like.

The database 140 may store data associated with the computing system 100, such as user data, transmissions, metadata, models, outputs, sequences, tokens, arrays, logits, metrics, values, strings, text, model vocabulary, features, scores, thresholds, predictions, likelihoods, and labels, among other suitable information. In various implementations, the database 140 may store vectorized embeddings or other high-dimensional representations and associated feature vectors in a vector space, such as to enable efficient similarity searches, clustering, and advanced AI analytics. In such implementations, portions of the database 140 may incorporate aspects of a vector database or be embedded in a multi-database architecture that enables proximity metrics and vector space computations. In various implementations, the database 140 may store documents, categories, embeddings, lists, entities, events, datasets, features, instances, attributes, values, variables, scores, degrees or measures (or other suitable quantities), decision trees, engines, classifiers, predictions, formulas, metrics, input, output, queries, responses, requests, application information, instructions, user data, configurations, thresholds, data associated with attacks and mitigation techniques, data associated with changes, events, change data capture (CDC) information, event bus (EB) information, filters, data assets, preferences, priorities, timestamps, models, algorithms, modules, engines, user information, historical data, recent data, current or real-time data, files, plugins, arrays, tags, queries, feedback, formats, and features, among other suitable information. In various implementations, the database 140 stores data associated with artificial neural network (ANN) models, such as the models themselves, untrained models, pretrained models, tuned models, aligned models, reward models, neural network (NN) parameters (e.g., weights, biases, tensors, parameters), architectures (e.g., layer descriptions, neurons, activation functions, overall structures), training data and related information (e.g., statistics, distribution, size, preprocessing steps, training data, text corpora, tuning data, alignment data, alignment data snapshots, alignment preferences, metric logs, accuracies, loss functions and values), hyperparameters (e.g., learning rates, batch sizes, numbers of epochs), evaluation results (e.g., performance metrics and models, validation data, test sets, benchmark scores, thresholds, receiver operating characteristic (ROC) curves, confusion matrices), versioning information (e.g., iterations, updates), metadata and documentation (e.g., usage instructions, authors), deployment configurations (e.g., settings for deploying models in different environments), monitoring data (e.g., real-time or periodic tracking performance in production), or any other suitable data related to ANN models. In various implementations, the database 140 may store data in one or more cloud object storage services, such as one or more Amazon Web Services™ (AWS™)-based Simple Storage Service (S3) buckets. In various implementations, the database 140 incorporates aspects of a database management system (DBMS) or a relational DBMS (RDBMS). In various implementations, the data may be stored in one or more JavaScript™ Object Notation (JSON) files, comma-separated values (CSV) files, or any other suitable data objects for processing by the computing system 100. In some implementations, the data may be stored in one or more Structured Query Language (SQL) compliant datasets for filtering, querying, and sorting, or any other suitable format for processing by the computing system 100. In various implementations, the database 140 includes a relational database capable of presenting information as datasets in tabular form and capable of manipulating the datasets using relational operators.

The one or more LMs 150 may be any suitable generative AI model trained on a large corpus of text to generate written responses, answer questions, translate language, and/or assist with various natural language processing (NLP)-based tasks. The generations may be output by the LM 150 as a sequence of concatenated output tokens in the form of strings of text. Each token in the sequence may be associated with a corresponding array of logits, where each logit is a value indicating a likelihood that a corresponding candidate token (e.g., one or more characters) in a vocabulary of the LM 150 is a best next token for the sequence. The arrays of logits may be retrieved from a final transformation layer of the LM 150 (e.g., during generation of the sequence of output tokens), as described at least with respect to FIG. 3. The one or more LMs 150 may be hosted (e.g., as a containerized microservice) in conjunction with the computing system 100, thereby enabling direct, low-latency access to the LM 150's internal representation outputs (e.g., the final transformation layer), such as via a shared memory or a high-speed API. In various implementations, the LM 150 may be a large language model (LLM) or a multimodal large language model (MLLM). In various implementations, the LM 150 is integrated directly into the one or more applications 130 or as a separate service. In various implementations, the LM 150 may receive requests (e.g., from the one or more applications 130), and may provide responses (e.g., to the one or more applications 130). In various implementations, the LM 150 may be embedded within one or more of the applications 130, the LM 150 may be hosted externally (e.g., accessed via APIs or cloud-based services) and in direct communication with one or more of the applications 130, or the LM 150 may be hosted externally and in indirect communication with the at least one application 130 (e.g., via an intermediate service, application, or system, such as an AI firewall). In various implementations, the LM 150 may use various AI accelerators to process vast amounts of textual data (e.g., from the Internet), integrate with one or more ANNs with millions, billions, trillions, or more weights or parameters, use self-supervised and/or semi-supervised training methods, and/or incorporate aspects of the transformer architecture and/or mixture of experts (MoE). Example LMs may include OpenAI's ChatGPT™, Google's Gemini™, Meta's LLaMa™, BigScience's BLOOM™, Baidu's Ernie™, Anthropic's Claude™, Mistral AI's Mistral™, independently developed models, or any another suitable type of generative AI model that outputs strings of text formed by a concatenation of tokens.

Figure 2:
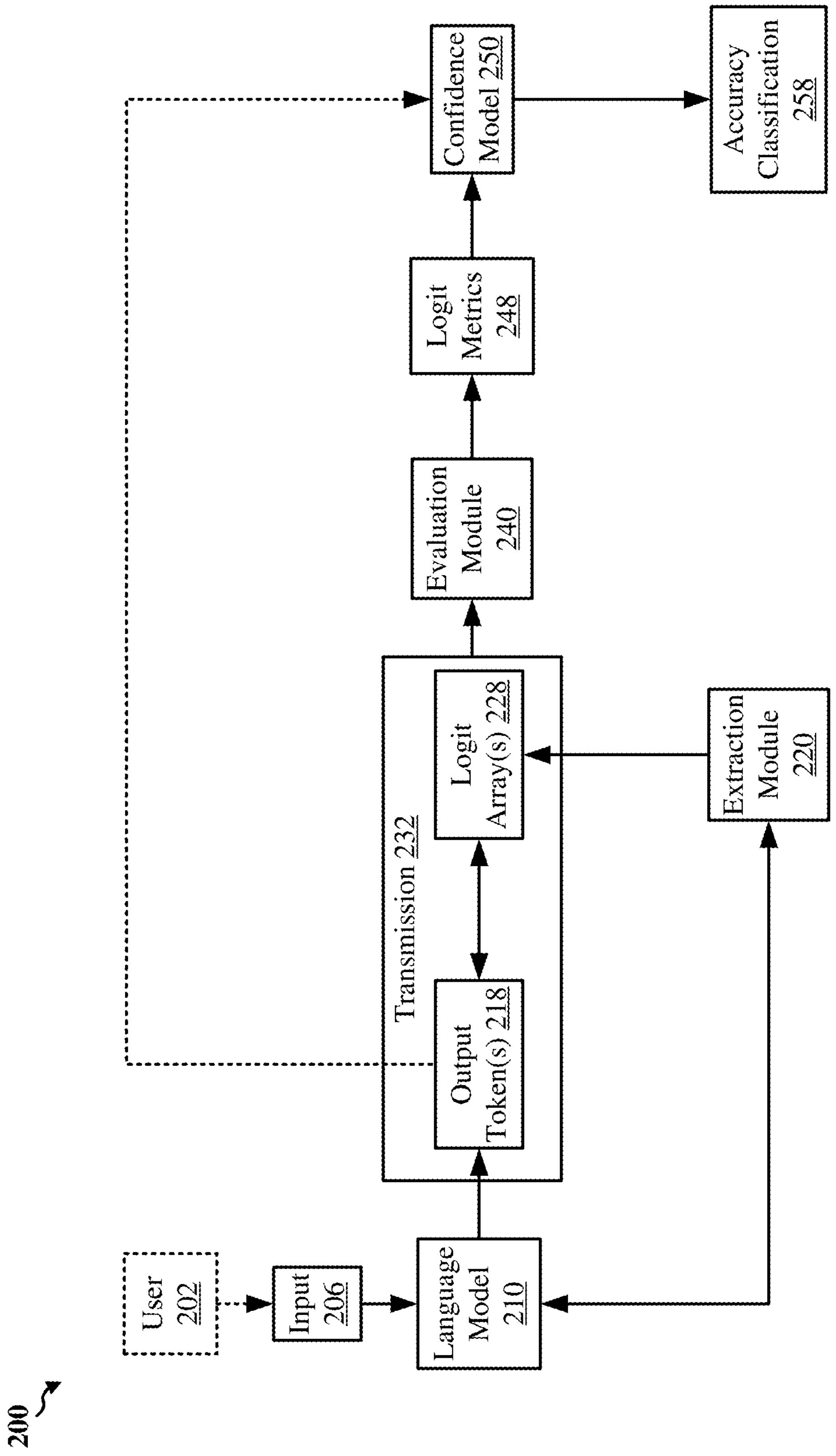
FIG. 2 shows an example process flow for classifying an accuracy of a language model's (LM's) output, according to some implementations.
Figure 3:
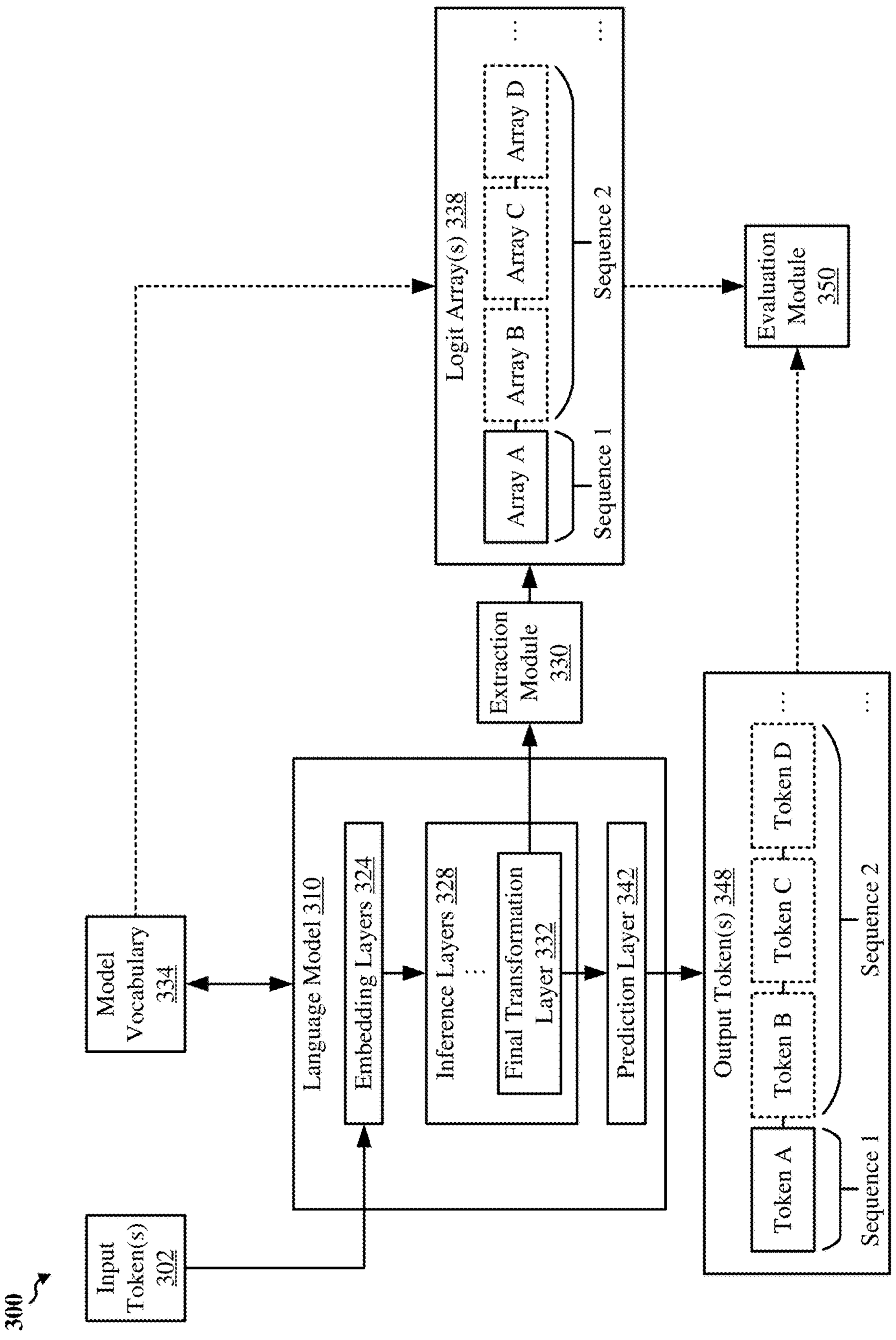
FIG. 3 shows an example process flow for obtaining a sequence of one or more output tokens and associated array(s) of logits, according to some implementations.

The extraction module 160 may be used to extract arrays of logits from an LM (e.g., the LM 150), as described at least with respect to FIGS. 2-3.

Figure 4:
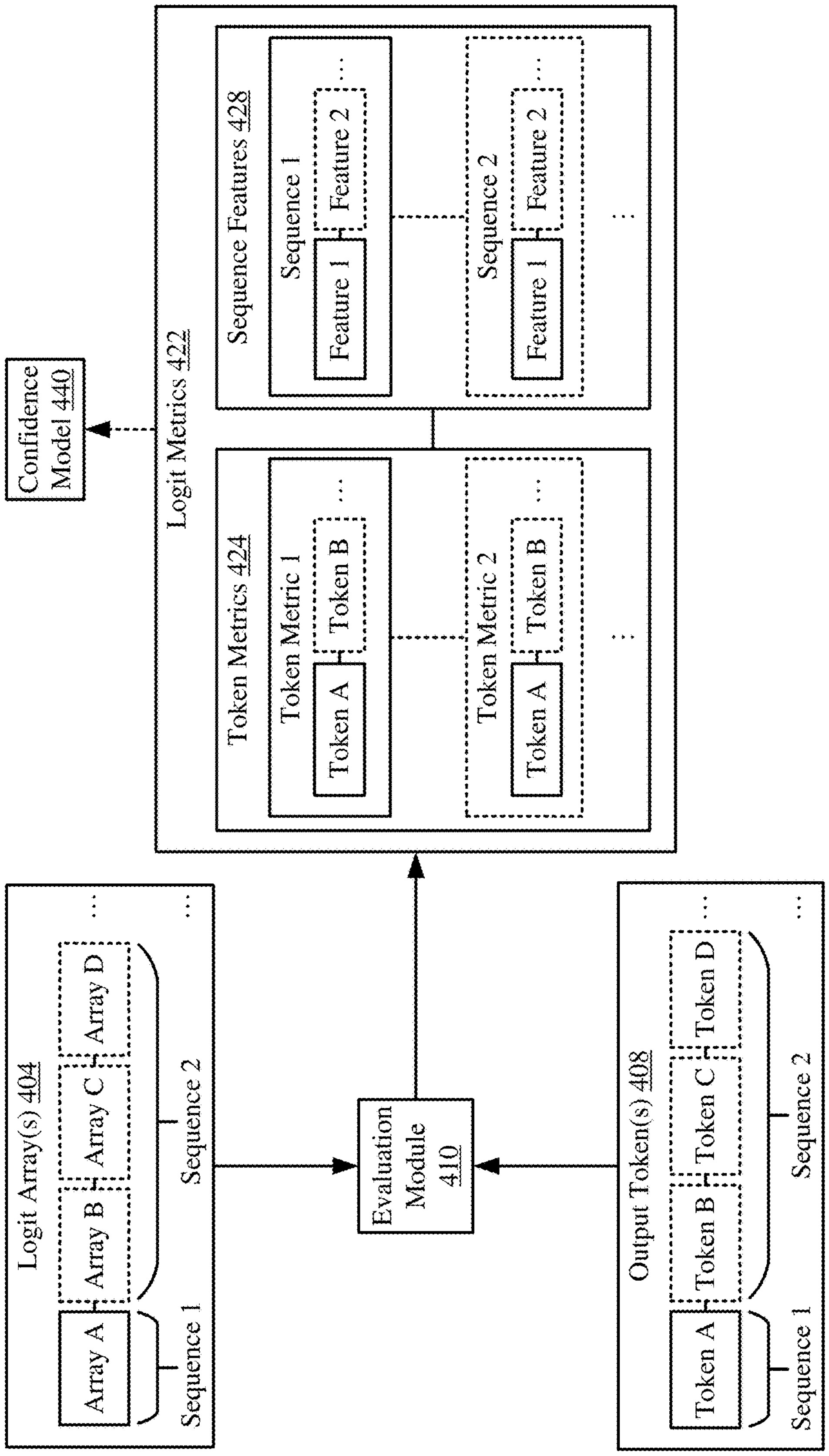
FIG. 4 shows an example process flow for generating a set of logit metrics, according to some implementations.

The evaluation module 170 may be used to generate logit metrics, as described at least with respect to FIGS. 2 and 4.

Figure 5:
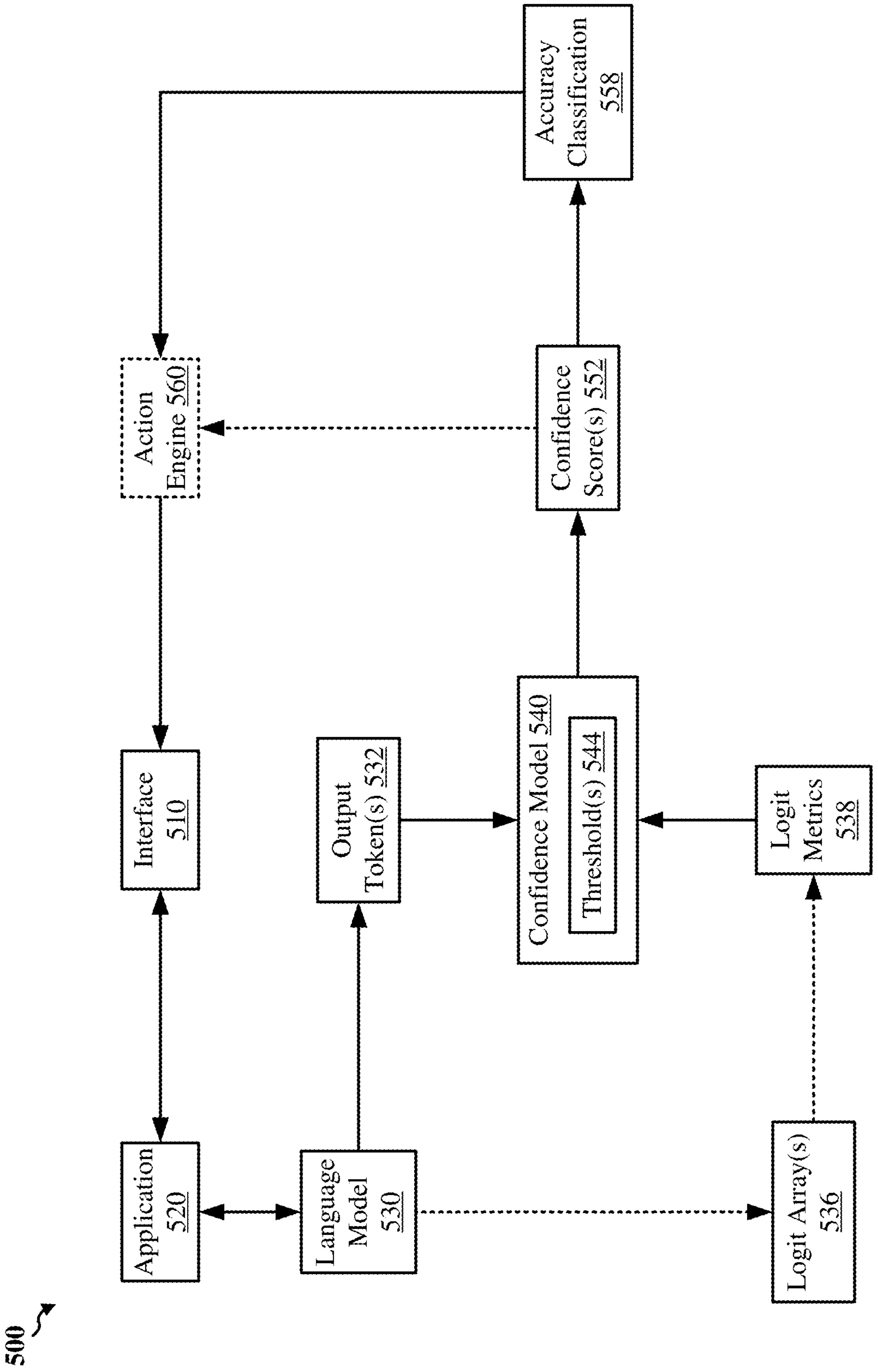
FIG. 5 shows an example process flow for predicting whether a sequence of output tokens is accurate, according to some implementations.

The confidence model 180 may be trained to predict whether a sequence of tokens (e.g., output from the LM 150) is accurate based on logit metrics, as described at least with respect to FIGS. 2 and 5.

The action engine 190 may be used to perform one or more actions (e.g., adjusting a user interface, such as the interface 120) based on one or more outputs from the confidence model 180, as described at least with respect to FIG. 5.

The application 130, the database 140, the LM 150, the extraction module 160, the evaluation module 170, the confidence model 180, and the action engine 190, are implemented in software, hardware, or a combination thereof. In some implementations, any one or more of the application 130, the database 140, the LM 150, the extraction module 160, the evaluation module 170, the confidence model 180, or the action engine 190, is embodied in instructions that, when executed by the processor 110, cause the computing system 100 to perform operations. In various implementations, the instructions of one or more of said components and/or the interface 120 are stored in the memory 114, the database 140, or a different suitable memory, and are in any suitable programming language format for execution by the computing system 100, such as by the processor 110. It is to be understood that the particular architecture of the computing system 100 shown in FIG. 1 is but one example of a variety of different architectures within which aspects of the present disclosure can be implemented. For example, in some implementations, components of the computing system 100 are distributed across multiple devices, included in fewer components, and so on.

While the below examples related to classifying an accuracy of an LM's output are described with reference to the computing system 100, other suitable system configurations may be used.

FIG. 2 shows an example process flow 200 for classifying an accuracy of a language model's (LM's) output, according to some implementations, and may be performed by one or more processors of a computing system, such as the computing system 100 described with respect to FIG. 1. The example process flow 200 shows an LM 210, an extraction module 220, an evaluation module 240, and a confidence model 250, which may be examples of the LM 150, and the confidence model 180 described with respect to FIG. 1, respectively.

The example process flow 200 starts with receiving a transmission 232. The transmission 232 may be received over a communications network from a computing device. The transmission 232 may include a sequence of one or more output tokens 218. In some implementations, the output tokens 218 are obtained from a prediction layer of the LM 210. The output tokens 218 may be generated by the LM 210 responsive to receiving an input 206. In some instances, the input 206 is a query or a request (e.g., from a user 202) for the LM 210. Each output token in the sequence of output tokens 218 may be associated with a corresponding logit array in a set of one or more logit arrays 228. In some implementations, the logit arrays 228 are extracted (e.g. using the extraction module 220) from a final transformation layer of the LM 210, as further described with respect to FIG. 3. The transmission 232 may be provided to the evaluation module 240.

The example process flow 200 continues with generating (e.g., using the evaluation module 240) a set of logit metrics 248 for the sequence of output tokens 218 based on the logit arrays 228, as further described with respect to FIG. 4. The logit metrics 248 and the output tokens 218 may be provided to the confidence model 250.

The example process flow 200 continues with predicting (e.g., using the confidence model 250) whether the sequence of output tokens 218 is accurate based on the logit metrics 248, as further described with respect to FIG. 5. The confidence model 250 may be trained (e.g., using training data in conjunction with a machine learning (ML) technique) to generate, for a given sequence of output tokens, a confidence score predictive of whether the given sequence is accurate, as further described with respect to FIG. 5. The confidence model 250 may generate one or more accuracy classifications 258 for the sequence of output tokens 218 based on the prediction.

FIG. 3 shows an example process flow 300 for obtaining a sequence of one or more output tokens and associated array(s) of logits, according to some implementations, and may be performed by one or more processors of a computing system, such as the computing system 100 described with respect to FIG. 1. The example process flow 300 shows a language model (LM) 310, an extraction module 330, and an evaluation module 350, which may be examples of the LM 210, the extraction module 220, and the evaluation module 240, respectively, described with respect to FIG. 2.

The example process flow 300 starts with providing one or more input tokens 302 to one or more embedding layers 324 of the LM 310. In some implementations, the input tokens 302 may be a tokenized transformation of an input query or request, such as the input 206 of FIG. 2. For instance, a tokenizer (e.g., associated with the LM 310) may be used to break down raw text of the query or request into the set of input tokens 302. The embedding layers 324 may be used (e.g., in conjunction with an embedding matrix) to map the input tokens 302 to a dense vector representation (one or more "embeddings") that captures a semantic meaning of the query or request. The embeddings may be passed through one or more inference layers 328 of the LM 310. Each of the inference layers 328 (or "transformer blocks") may apply various self-attention and feedforward operations that iteratively refine the dense vector representation using context from previous iterations. A last layer of the inference layers 328 is shown as a final transformation layer 332.

An output of the final transformation layer 332 (e.g., a "final hidden state" or "final token representation") may pass through a linear transformation layer (not shown for simplicity) of the LM 310, which may also be referred to as an "LM head" or an "un-embedding layer." The linear transformation layer may transform (e.g., using a weight matrix in conjunction with a model vocabulary 334 associated with the LM 310) the output of the final transformation layer 332 into a logit vector that maps a raw logit score to each token in the model vocabulary 334. For instance, each raw logit score may be a value (prior to any scaling, normalization, or transformation) indicating a likelihood that a corresponding candidate token (e.g., one or more characters) in the model vocabulary 334 is a best next token for a sequence of output tokens. At prediction 342, the LM 310 may use a sampling algorithm (e.g., greedy, top-k, etc.) in conjunction with an activation function (e.g., softmax) to convert the raw logit scores into probabilities, and the LM 310 may use the probabilities to predict output tokens 348 (which may be an example of the output tokens 218 of FIG. 2). In some implementations, the text output for each token corresponds to the position of the highest raw logit score in the respective logit array. The output tokens 348 may include any number of output sequences, and each output sequence may include any number of output tokens. For the simplified example shown in FIG. 3, a first sequence ("Sequence 1") includes one token ("Token A") and a second sequence ("Sequence 2") includes three tokens ("Token B", "Token C", and "Token D"). Although not shown for simplicity, each output token may be used in predicting the next output token in a same sequence. For example, after outputting Token C for Sequence 2, Token C may be fed back into the LM 310 and used in predicting Token D for Sequence 2.

Aspects of the present disclosure recognize that the raw logit scores contain rich information. Accordingly, the extraction module 330 may be used to extract the raw logit scores (e.g., during generation of the output tokens 348) and store them in one or more logit arrays 338 (which may be an example of the logit arrays 228 of FIG. 2). Specifically, for each respective output token in the output tokens 348, the extraction module 330 may generate an array of logits in the logit arrays 338 that includes the raw logit scores associated with the output of the final transformation layer 332 for the respective output token. For this example, Sequence 1 is mapped to a first array of logits ("Array A" corresponding to the raw logit scores associated with Token A) and Sequence 2 is mapped to a second, third, and fourth array of logits ("Array B" corresponding to the raw logit scores associated with Token B, "Array C" corresponding to the raw logit scores associated with Token C, and "Array D" corresponding to the raw logit scores associated with Token D).

In practical applications, the model vocabulary 334 may comprise tens of thousands to hundreds of thousands of unique tokens (e.g., characters or combinations of characters). As a non-limiting example, the model vocabulary 334 may include 50,000 tokens, and thus, each logit array in the logit arrays 338 would include 50,000 logits. Furthermore, the processes described above may be performed in milliseconds and may be repeated millions or even billions of times as the LM 310 generates output sequences for various input queries or requests. For example, if the LM 310 is integrated into a conversational AI system, the LM 310 may generate responses to thousands of user inputs per second, where each response has its own sequence of output tokens 348 and associated logit arrays 338. Accordingly, in various implementations, the extraction module 330 may be configured to use one or more tensor processing units (TPUs) (or other custom-built application-specific integrated circuits (ASICs) configured for a machine learning (ML) workload) to efficiently process the raw logits. Furthermore, in various implementations, the extraction module 330 may be configured to use specialized data structures (e.g., sparse matrices or tensors) to efficiently store the logit arrays 338 and/or various techniques (e.g., downsampling or dimensionality reduction) to efficiently manage the logit arrays 338.

The output tokens 348 and the logit arrays 338 may be provided to the evaluation module 350 for further processing.

FIG. 4 shows an example process flow 400 for generating a set of logit metrics, according to some implementations, and may be performed by one or more processors of a computing system, such as the computing system 100 described with respect to FIG. 1. The example process flow 400 shows an evaluation module 410 and a confidence model 440, which may be examples of the evaluation module 350 and the confidence model 250, respectively, described with respect to FIGS. 2-3.

The example process flow 400 starts with receiving logit arrays 404 and output tokens 408 at the evaluation module 410. The logit arrays 404 and the output tokens 408 may be examples of the logit arrays 338 and the output tokens 348, respectively, described with respect to FIG. 3. Therefore, although a small number of tokens (and thus, arrays) are shown for simplicity, it will be appreciated that any number of output tokens (and thus, arrays) may be provided to the evaluation module 410.

The example process flow 400 continues with using the evaluation module 410 to generate a set of logit metrics 422 for the sequence of output tokens 408 based on the logit arrays 404. The logit metrics 422 may be an example of the logit metrics 248 of FIG. 2. The logit metrics 422 may include token metrics 424 and sequence features 428.

The token metrics 424 represent a set of quantitative measures that characterize the distribution of logits for each of the output tokens 408. For instance, "Array A" may include a number of (e.g., 50,000) logits that each represent a raw score for a corresponding token in the model's vocabulary, and Token A may have been selected based on the token in the model's vocabulary associated with the highest (or "maximum") logit in Array A. In some implementations, one of the token metrics 424 (e.g., "Token Metric 1") may be based on a maximum logit in the array. In some implementations, one of the token metrics 424 (e.g., "Token Metric 2") may be based on a gap between the maximum logit and a second highest logit in the array. Aspects of the present disclosure recognize that a relatively higher gap between the maximum logit and the second highest logit is indicative of a relatively higher confidence in the corresponding selected token. In addition, or in the alternative, the evaluation module 410 may determine one or more different token metrics 424 based on the output tokens 408 and their corresponding logits in the logit arrays 404. For example, the evaluation module 410 may determine a ratio of the maximum logit to the average logit for each token, or a gap between the maximum logit and the average logit, thereby providing insight into a concentration of probability mass around each token. For another example, the evaluation module 410 may determine a gap between the second and third highest logits, a level of clustering among a subset of the logits, or any other metric based on the distribution of logits in the array.

As a non-limiting example, if Token A is "Hello" and the logit associated with "Hello" is 4.272457 (i.e., the maximum logit in Array A), the evaluation module 410 may include 4.272457 under Token Metric 1 for Token A in the token metrics 424. As another example, if "Sequence 2" (comprised of "Token B", "Token C", and "Token D") is "−1000.", Token B is "-", Token Cis "1000", Token D is ".", and the maximum logits for Tokens B-D are −0.661026, 6.070946, and −7.044714, respectively, the evaluation module 410 may include-0.661026, 6.070946, and −7.044714 under Token Metric 1 for Tokens B-D, respectively. For comparison, it is noted that example softmax values for Tokens A-D may be 0.999999, 0.996622, 0.999937, and 0.999567, respectively, where experiments show that these values are on average much higher than the frequency of correct extraction. Furthermore, for this example, if the second highest logit associated with each of Tokens A-D is −10.015238, −7.662644, −4.600681, and −15.164426, respectively, the evaluation module 410 may determine the gap between the maximum logit and the second highest logit for each of Tokens A-D (i.e., 4.272457−−10.015238=14.287695 for Token A; −0.661026−−7.662644=7.001618 for Token B; 6.070946−−4.600681=10.671627 for Token C; and −7.044714−−15.164426=8.119711 for Token D), and store each gap under Token Metric 2 for Token A-D, respectively. It will be appreciated that logit scores may have any number of significant digits.

In some implementations, the token metrics 424 may be stored in a data structure such as a table or matrix, where each row corresponds to one of the output tokens 408 and each column corresponds to a specific metric (e.g., Token Metric 1, Token Metric 2). For instance, for the non-limiting examples described above, the token metrics 424 may be stored in a table with columns labeled "Token", "Token Metric 1" (maximum logit), and "Token Metric 2" (gap), where the rows of the table contain the corresponding values for each output token so that each row represents a single output token and associated metrics.

Each of the sequence features 428 characterizes a sequence of output tokens based on an aggregation of the token metrics 424 associated with the subset of the output tokens 408 concatenated into that sequence. For the non-limiting example of "Sequence 1", the subset includes only one token (i.e., Token A); thus, the sequence features 428 for Sequence 1 are generated based on the subset of the token metrics 424 generated based on the logits in Array A. By contrast, for the non-limiting example of "Sequence 2", the subset includes three tokens (i.e., Tokens B-D); thus, the sequence features 428 for Sequence 2 are generated based on the subset of the token metrics 424 generated based on the logits in Arrays B-D. It will be appreciated that Sequences 1-2 are simplified examples and that a sequence may include any number (e.g., tens, hundreds, thousands, tens of thousands, etc.) of tokens.

The present disclosure contemplates a wide range of techniques for featurizing the distributions of logits to predict an accuracy for a given sequence. In some implementations, the sequence features 428 include at least one of: a total number of output tokens in the given sequence, an overall highest maximum logit among the arrays of logits associated with the given sequence, an overall lowest maximum logit among the arrays of logits associated with the given sequence, an overall biggest gap between each maximum logit and each second highest logit among the arrays of logits associated with the given sequence, or an overall smallest gap between each maximum logit and each second highest logit among the arrays of logits associated with the given sequence. Furthermore, aspects of the present disclosure recognize that if a model has low confidence for one token in a sequence, the entire sequence is more likely to be incorrect. Therefore, for sequences with multiple tokens, a relatively lower confidence in accuracy is indicated when the output token with the lowest maximum logit also has the smallest gap between the maximum and second highest logits for that output token (with this effect increasing as the number of tokens in the sequence increases). Therefore, in some implementations, the sequence features 428 include a binary value indicating whether the output token with the overall lowest maximum logit coincides with the one having the overall smallest gap. In some other implementations, the one or more sequence features 428 include a maximum logit trend indicating a change in the maximum logits for successive tokens, thereby indicating how the confidence level changes across successive tokens in the given sequence, where a steadily increasing maximum logit may be more indicative of a steadily increasing confidence in the sequence (and vice versa). In some other implementations, the one or more sequence features 428 include a gap trend indicating a change in the gap between the maximum logit and the second highest logit for successive tokens, thereby indicating how the difference between the most likely and second-most likely tokens changes across successive tokens in the given sequence, where a steadily increasing gap may be more indicative of a steadily increasing confidence in the sequence (and vice versa). In yet other implementations, the sequence features 428 may include any one or more of: statistical distributions (e.g., mean, median, standard deviation) of the logits in the given sequence; quantiles (e.g., 5th, 25th, 50th, 75th, 95th percentiles) of the logits in the given sequence; clustering of the logits in the given sequence; entropy or other measures of uncertainty for the logits in the given sequence; skewness of the logits in the given sequence; minimum and maximum values of the logits in the given sequence; average or cumulative sums of the logits in the given sequence; a ratio or difference of maximum and second-highest logits for the logits in the given sequence; histograms or density estimates of the logits in the given sequence; or any other suitable measures of the distributions of logits for the given sequence and/or one or more output tokens in the given sequence.

In some implementations, the sequence features 428 may be stored in a data structure such as a table or matrix, where each row corresponds to one of the sequences (e.g., Sequence 1, Sequence 2) and each column corresponds to a specific feature (e.g., Feature 1, Feature 2). For instance, the sequence features 428 may be stored in a table with columns labeled "Sequence", "Feature 1" (e.g., total number of output tokens), "Feature 2" (e.g., overall highest maximum logit), and so on, where the rows of the table contain the corresponding values for each sequence so that each row represents a single sequence and associated features.

It will be appreciated that, in practical applications, the logit arrays 404 may comprise large numbers of elements corresponding to a model vocabulary with tens of thousands to hundreds of thousands of unique tokens. For instance, if the model vocabulary includes 50,000 tokens, each logit array in the logit arrays 404 would include 50,000 logits. The processes described above for generating logit metrics 422 may be performed efficiently and rapidly (e.g., within milliseconds) and may be repeated millions or billions of times. Accordingly, in various implementations, the evaluation module 410 may be configured to use one or more tensor processing units (TPUs) (or other custom-built application-specific integrated circuits (ASICs) configured for a machine learning (ML) workload) to efficiently process the logit arrays 404. Furthermore, in various implementations, the evaluation module 410 may be configured to use specialized data structures (e.g., sparse matrices or tensors) to efficiently store the logit metrics 422 and/or various techniques (e.g., downsampling or dimensionality reduction) to efficiently manage the logit metrics 422.

The logit metrics 422 may be provided to the confidence model 440 for further processing.

FIG. 5 shows an example process flow 500 for predicting whether a sequence of output tokens is accurate, according to some implementations, and may be performed by one or more processors of a computing system, such as the computing system 100 described with respect to FIG. 1. The example process flow 500 shows an interface 510, an application 520, a language model (LM) 530, a confidence model 540, and an action engine 560, which may be examples of the interface 120, the application 130, the LM 310, the confidence model 440, and the action engine 190, respectively, described with respect to FIGS. 1 and 3-4.

The example process flow 500 starts with providing a sequence of output tokens 532 and a set of logit metrics 538 to the confidence model 540. The output tokens 532 and the logit metrics 538 may be examples of the output tokens 408 and the logit metrics 422, respectively, of FIG. 4. The logit metrics 538 may be generated based on one or more logit arrays 536, which may be an example of the logit arrays 404 of FIG. 4. The logit arrays 536 may be extracted from the LM 530 (e.g., during prediction), and the output tokens 532 may be output from the LM 530 (e.g., after prediction). The LM 530 may be used in conjunction with the application 520 to facilitate providing information and/or an experience to a user, such as via the interface 510.

The example process flow 500 continues with predicting, using the confidence model 540, whether the sequence of output tokens 532 is accurate based on the set of logit metrics 538. Specifically, the confidence model 540 may generate one or more confidence scores 552 for the sequence of output tokens 532 based on one or more sequence features (characterizing the sequence of output tokens 532) included among the logit metrics 538. The sequence features may be an example of the sequence features 428 of FIG. 4. The predicting may further include classifying an accuracy of the sequence of output tokens 532 based on comparing the one or more confidence scores 552 with one or more thresholds 544. In this manner, the confidence model 540 may generate an accuracy classification 558 for the sequence of output tokens 532. For instance, if the confidence score 552 is greater than the threshold 544, the accuracy classification 558 may indicate that the sequence of output tokens 532 is accurate or "trustworthy." In contrast, if the confidence score 552 is not greater than the threshold 544, the accuracy classification 558 may indicate that the sequence of output tokens 532 is not accurate or "not trustworthy." In some other implementations, the confidence model 540 may generate a confidence score for each respective output token in the sequence of output tokens 532 based on the subset of the logit metrics 538 associated with the respective output token. In some of such implementations, the confidence model 540 may generate an overall confidence score 552 for the sequence of output tokens 532 based on a cumulative comparison of the confidence scores with the threshold 544. In some other of such implementations, the sequence of output tokens 532 may be classified as "accurate" if all of the confidence scores are greater than the threshold 544, and the sequence of output tokens 532 may be classified as "not accurate" if any of the confidence scores are not greater than the threshold 544.

The example process flow 500 continues with adjusting the interface 510 based on the accuracy classification 558 and/or the confidence scores 552.

In some implementations, the accuracy classification 558 represents a binary "accurate" or "not accurate" classification of the sequence of output tokens 532, and the action engine 560 may be used to adjust the interface 510 accordingly. As a non-limiting example, the application 520 may be a document data extraction application that generates key-value pairs, where each key corresponds to a field in a given document and each value is a string of text extracted (e.g., by an LM) from that field. For this example, a user may feed the application 520 (e.g., via the interface 510) a document including hundreds of text fields, and the output tokens 532 may include hundreds of sequences of output tokens, where each sequence is a prediction (e.g., made by the LM 530) of the text included in the corresponding text field of the document. For this example, the confidence model 540 may generate an accuracy classification 558 for each of the predicted sequences, and a list of at least the sequences classified as "not accurate" may be provided to the action engine 560. Thereafter, the action engine 560 may provide (e.g., via the interface 510) the predicted texts to the user along with a suggestion to verify the text fields associated with the sequences classified as "not accurate" in the list.

In some other implementations, the accuracy classification 558 represents a non-binary classification indicating a degree of accuracy associated with each sequence of output tokens 532. For the non-limiting example above where the application 520 is a document data extraction application, the confidence model 540 may generate a confidence score between 0 and 1 for each sequence, where higher scores indicate greater confidence in the accuracy of the predicted text. The action engine 560 may then use these confidence scores to adjust the interface 510 in a tiered manner. For instance, the action engine 560 may categorize the sequences into multiple ranges based on their corresponding confidence scores (e.g., low confidence, 0-0.3; medium confidence, 0.4-0.7; high confidence, 0.8-1), and provide different suggestions or flags to the user accordingly. For example, text fields with predicted texts having low confidence scores may be highlighted for verification in red, text fields with predicted texts having medium confidence scores may be highlighted for confirmation in yellow, and text fields with predicted texts having high confidence scores may be highlighted as trustworthy in green, thereby allowing the user to focus on reviewing only the most uncertain predictions.

In yet other implementations, the application 520 may utilize multiple LMs as the LM 530, such as a first LM and a second LM, to generate output tokens 532. In such implementations, the confidence model 540 may generate accuracy classifications 558 and confidence scores 552 for each sequence of output tokens 532 produced by both the first LM and the second LM. The action engine 560 may then use these confidence scores to reconcile the outputs produced by the first LM and the second LM (e.g., determine which prediction to trust) and/or how to adjust the interface 510 accordingly. For the non-limiting example above where the application 520 is a document data extraction application, if the first LM extracts a value "X" from field A with a high confidence score of 0.9, while the second LM extracts a different value "Y" from field A with a low confidence score of 0.2, the action engine 560 may cause the first LM's prediction to be used on the interface 510 (rather than the second LM's prediction) due to the first LM's prediction having a significantly higher confidence score. In some other instances, such as if the confidence scores for the first and second LMs are relatively close, the action engine 560 may flag the discrepancy for user review and display both predictions side-by-side along with a prompt for the user to verify one of the extracted values. It will be appreciated that relying solely on softmax scores from each LM would result in poor calibration and ineffective discrimination between the two extracted values, as experiments have shown that softmax scores are overly optimistic and do not accurately reflect the rate at which model predictions are accurate. In contrast, by utilizing distributions of logits to inform the confidence scores, as described herein, experiments have shown that the application 520 can achieve better calibration and more reliable predictions of the accuracy of LM outputs, thereby reducing the need for manual verification and review.

As another non-limiting example, the application 520 may be utilized for document classification tasks. For instance, the application 520 may use the LM 530 to classify documents into one or more categories from a predefined set of classes, where each class corresponds to a specific token. In such implementations, the LM 530 may output a sequence of tokens representing the predicted class labels for a given document, and the confidence model 540 may generate confidence scores 552 and accuracy classifications 558 for each predicted class label. For example, if the LM 530 is used to classify documents into one of several categories (e.g., news articles about sports, politics, entertainment, or technology), the confidence model 540 may assign a high confidence score to classifications where the LM 530 has output a token with a high probability of being correct (e.g., a document classified as "sports" with a confidence score of 0.9). Conversely, if the LM 530 outputs a classification with low confidence (e.g., a document classified as "entertainment" with a confidence score of 0.35), or if multiple classes have similar confidence scores (e.g., a document classified as "politics" with a confidence score of 0.6 that also has a confidence score of 0.55 for the class "news"), the action engine 560 may flag the document for review or request additional verification from the user.

The example process flow 500 represents a real-time ("inference time") deployment of the trained confidence model 540. Accordingly, the action engine 560 may adjust the interface 510 in at least near real-time with the output tokens 532 being received, which may be in at least near real-time with a user providing an input to the application 520 (e.g., via the interface 510) that causes the LM 530 to generate the output tokens 532.

During a training phase that occurs prior to real-time deployment, the confidence model 540 may be trained using a plurality of training sequences of output tokens and a ground truth sequence for each training sequence. Each training sequence may include one or more output tokens, where each output token is associated with a corresponding array of logits. The training sequences may be obtained from the LM 530 or an equivalent generative AI model, such as in the manners described with respect to the output tokens 348 and the logit arrays 338 of FIG. 3. A set of token metrics may be generated for each token in each training sequence based on the logits, such as in the manners described with respect to the token metrics 424 of FIG. 4. For each respective training sequence, the token metrics generated for the one or more tokens in the respective training sequence may be aggregated into one or more sequence features each indicating a characteristic of the respective training sequence, such as in the manners described with respect to the sequence features 428 of FIG. 4. In various implementations, the one or more sequence features include at least one of a total number of output tokens in the training sequence, an overall highest maximum logit among the arrays of logits associated with the training sequence, an overall lowest maximum logit among the arrays of logits associated with the training sequence, an overall biggest gap between each maximum logit and each second highest logit among the arrays of logits associated with the training sequence, or an overall smallest gap between each maximum logit and each second highest logit among the arrays of logits associated with the training sequence. A binary label may be generated for each training sequence based on a comparison of the training sequence with a corresponding ground truth sequence. Specifically, each binary label may indicate whether the training sequence is accurate based on whether the training sequence matches a ground truth sequence corresponding to the training sequence. In some implementations, each ground truth sequence comprises a string of characters, and a given training sequence may be labeled as "accurate" if the characters of the concatenated text from the output tokens of the given training sequence match the corresponding ground truth string (and vice versa). In some other implementations, rather than binary labels, partial accuracy scores may be generated based on various measures (e.g., Levenshtein distance) between the training sequence and the ground truth sequence corresponding to the training sequence. Training data may be generated based on the sequence features and the binary labels. Specifically, the sequence features for each training sequence may be paired with the corresponding binary label to form a set of labeled feature vectors that can be used to train the confidence model 540 using a supervised machine learning (ML) technique (e.g., logistic regression, XGBoost, a neural network, or the like). Thereafter, the training data may be used in conjunction with the ML technique to train the confidence model 540 to generate, for a given output sequence, a confidence score (e.g., a probability between 0 and 1) predictive of whether the given output sequence is accurate based on the output sequence's features. The confidence model 540 may be iteratively updated until a loss function value (e.g., cross-entropy loss) converges to a predetermined threshold amount, thereby indicating that the model's predictions of output sequence accuracy are stabilized and can reliably infer the accuracy of an LM's output values.

Figure 6:
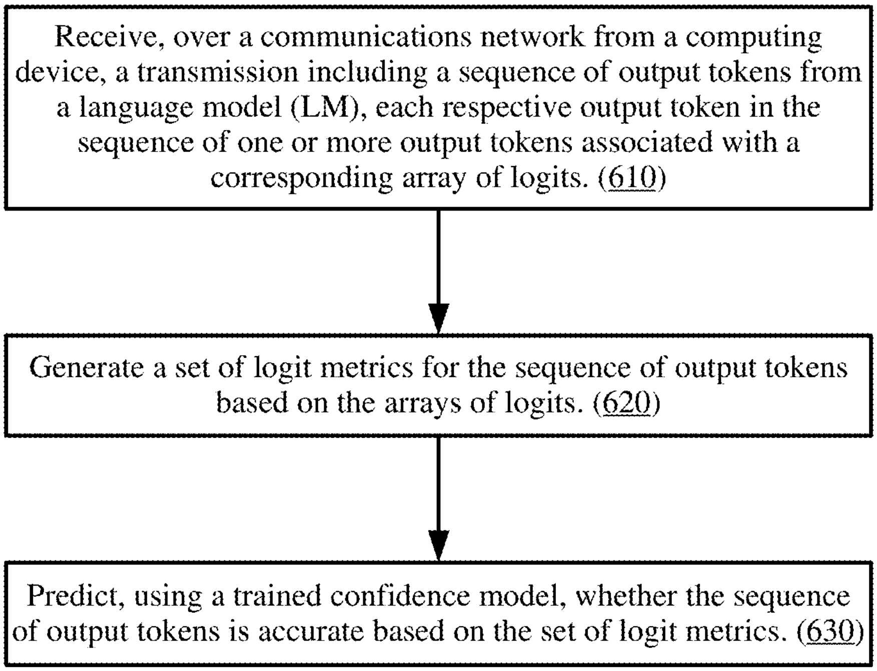
FIG. 6 shows an illustrative flowchart depicting an example operation for classifying an accuracy of an LM's output, according to some implementations.

FIG. 6 shows an illustrative flowchart 600 depicting an example operation for classifying an accuracy of a language model's (LM's) output, according to some implementations, and may be performed by one or more processors of a computing system, such as the computing system 100 described with respect to FIG. 1. For example, at block 610, the computing system 100 receives, over a communications network from a computing device, a transmission including a sequence of one or more output tokens from an LM, each respective output token in the sequence of output tokens associated with a corresponding array of logits. At block 620, the computing system 100 generates a set of logit metrics for the sequence of output tokens based on the arrays of logits. At block 630, the computing system 100 predicts, using a trained confidence model, whether the sequence of output tokens is accurate based on the set of logit metrics.

As used herein, a phrase referring to "at least one of" a list of items refers to any combination of those items, including single members. As an example, "at least one of: a, b, or c" is intended to cover: a, b, c, a-b, a-c, b-c, and a-b-c. Similarly, unless noted otherwise, "or" is used inclusively herein, such that "a, b, or c" refers to any combination of those items, including single members.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The various illustrative logics, logical blocks, modules, circuits, and algorithm processes described in connection with the implementations disclosed herein may be implemented as electronic hardware, computer software, or combinations of both. The interchangeability of hardware and software has been described, in terms of functionality, and illustrated in the various illustrative components, blocks, modules, circuits and processes described above. Whether such functionality is implemented in hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

What is claimed is:

1. A computer-implemented method performed by one or more processors of a computing system and comprising:

extracting first arrays of raw logits from a linear transformation layer of a first language model (LM) that maps a final hidden state to a vocabulary of the first LM, the first arrays of raw logits being extracted prior to applying an activation function that converts the first arrays of raw logits into nominal probabilities;

storing the first arrays of raw logits as one or more sparse matrices or tensors;

obtaining a first sequence of output tokens from the first LM, each of the output tokens associated with a corresponding array of raw logits retrieved from the one or more sparse matrices or tensors;

determining, for each respective output token in the first sequence of output tokens, a gap between a maximum raw logit and a second highest raw logit in the array of raw logits associated with the respective output token;

generating a first set of logit metrics for the first sequence of output tokens based on the gaps;

generating a first confidence score for the first sequence of output tokens based on an aggregation of the first set of logit metrics;

predicting, using a trained confidence model, whether the first sequence of output tokens is accurate based on the first confidence score;

obtaining a second sequence of output tokens from a second LM;

generating a second confidence score for the second sequence of output tokens based on a second set of logit metrics derived from second arrays of raw logits extracted from the second LM; and selectively outputting the first sequence of output tokens or the second sequence of output tokens to a downstream application task based on whether the second confidence score exceeds the first confidence score, wherein the selective outputting includes:

outputting the second sequence of output tokens to the downstream application task and refraining from outputting the first sequence of output tokens to the downstream application task responsive to the second confidence score exceeding the first confidence score; and outputting the first sequence of output tokens to the downstream application task and refraining from outputting the second sequence of output tokens to the downstream application task responsive to the second confidence score not exceeding the first confidence score.

2. The method of claim 1, wherein the first LM is a generative artificial intelligence (AI) model that outputs strings of text formed by a concatenation of tokens.

3. The method of claim 1, wherein each raw logit in each array of the first arrays of raw logits is a value indicating a likelihood that a corresponding candidate token in the vocabulary of the first LM is a best next token for the first sequence of output tokens.

4. The method of claim 1, wherein the first LM is hosted in conjunction with the computing system, and wherein the linear transformation layer is a final transformation layer of the first LM during generation of the first sequence of output tokens.

5. The method of claim 1, wherein the first set of logit metrics includes (i) for each output token in the first sequence of output tokens, a token metric based on a maximum raw logit in the corresponding array of the first arrays of raw logits or a token metric based on the gap between the maximum raw logit and a second highest raw logit in the corresponding array of the first arrays of raw logits and (ii) one or more sequence features each indicating a characteristic of the first sequence of output tokens, and wherein generating the first set of logit metrics includes aggregating the token metrics into the one or more sequence features.

6. The method of claim 5, wherein the one or more sequence features include a total number of output tokens in the first sequence of output tokens, an overall highest maximum raw logit among the first arrays of raw logits, an overall lowest maximum raw logit among the first arrays of raw logits, an overall biggest gap between each maximum raw logit and each second highest raw logit among the first arrays of raw logits, or an overall smallest gap between each maximum raw logit and each second highest raw logit among the first arrays of raw logits.

7. The method of claim 6, wherein the one or more sequence features further include a binary value indicating whether the output token, in the first sequence of output tokens, associated with the overall lowest maximum raw logit is also associated with the overall smallest gap.

8. The method of claim 5, wherein the one or more sequence features further include a maximum raw logit trend indicating a change in the maximum raw logits for successive tokens in the first sequence of output tokens or a gap trend indicating a change in the gap between the maximum raw logit and the second highest raw logit for successive tokens in the first sequence of output tokens.

9. The method of claim 5, wherein the predicting includes:
- classifying an accuracy of the first sequence of output tokens based on comparing the first confidence score with a threshold.

10. The method of claim 1, wherein the confidence model is trained based on:
- obtaining a plurality of training sequences and a ground truth sequence for each training sequence, wherein each training sequence includes one or more tokens, and wherein each token is associated with a corresponding array of raw logits;
- generating a set of token metrics for each token in each training sequence based on the raw logits;
- for each respective training sequence, aggregating the token metrics generated for the one or more tokens in the respective training sequence into one or more sequence features each indicating a characteristic of the respective training sequence;
- generating a binary label for each training sequence based on a comparison of the training sequence with its corresponding ground truth sequence, wherein each binary label indicates whether the training sequence is accurate based on whether the training sequence matches its corresponding ground truth sequence;
- generating training data based on the sequence features and the binary labels; and
- training, using the training data in conjunction with a machine learning (ML) technique, the confidence model to generate, for a given output sequence, a confidence score predictive of whether the given output sequence is accurate based on its sequence features.

11. The method of claim 10, wherein the one or more sequence features include a total number of output tokens in the training sequence, an overall highest maximum raw logit among the arrays of raw logits associated with the training sequence, an overall lowest maximum raw logit among the arrays of raw logits associated with the training sequence, an overall biggest gap between each maximum raw logit and each second highest raw logit among the arrays of raw logits associated with the training sequence, or an overall smallest gap between each maximum raw logit and each second highest raw logit among the arrays of raw logits associated with the training sequence.

12. The method of claim 1, wherein the confidence model is trained based in part on iteratively updating the confidence model until a cross-entropy loss function value converges to a predetermined threshold amount.

13. The method of claim 1, wherein the downstream application task comprises populating a text field.

14. A system for classifying an accuracy of a language model's (LM's) output, the system comprising:
- one or more processors; and
- at least one memory coupled to the one or more processors and storing instructions that, when executed by the one or more processors, cause the system to perform operations including:
  - extracting first arrays of raw logits from a linear transformation layer of a first language model (LM) that maps a final hidden state to a vocabulary of the first LM, the first arrays of raw logits being extracted prior to applying an activation function that converts the first arrays of raw logits into nominal probabilities;
  - storing the first arrays of raw logits as one or more sparse matrices or tensors;
  - obtaining a first sequence of output tokens from the first LM, each of the output tokens associated with a corresponding array of raw logits retrieved from the one or more sparse matrices or tensors;
  - determining, for each respective output token in the first sequence of output tokens, a gap between a maximum raw logit and a second highest raw logit in the array of raw logits associated with the respective output token;
  - generating a first set of logit metrics for the first sequence of output tokens based on the gaps;
  - generating a first confidence score for the first sequence of output tokens based on an aggregation of the first set of logit metrics;
  - predicting, using a trained confidence model, whether the first sequence of output tokens is accurate based on the first confidence score;
  - obtaining a second sequence of output tokens from a second LM;
  - generating a second confidence score for the second sequence of output tokens based on a second set of logit metrics derived from second arrays of raw logits extracted from the second LM; and selectively outputting the first sequence of output tokens or the second sequence of output tokens to a downstream application task based on whether the second confidence score exceeds the first confidence score, wherein the selective outputting includes:

outputting the second sequence of output tokens to the downstream application task and refraining from outputting the first sequence of output tokens to the downstream application task responsive to the second confidence score exceeding the first confidence score; and outputting the first sequence of output tokens to the downstream application task and refraining from outputting the second sequence of output tokens to the downstream application task responsive to the second confidence score not exceeding the first confidence score.

15. The system of claim 14, wherein the first LM is a generative artificial intelligence (AI) model that outputs strings of text formed by a concatenation of tokens.

16. The system of claim 14, wherein each raw logit in each array of the first arrays of raw logits is a value indicating a likelihood that a corresponding candidate token in the vocabulary of the first LM is a best next token for the first sequence of output tokens.

17. The system of claim 14, wherein the first LM is hosted in conjunction with the system, and wherein the linear transformation layer is a final transformation layer of the first LM during generation of the first sequence of output tokens.

18. The system of claim 14, wherein the first set of logit metrics includes (i) for each output token in the first sequence of output tokens, a token metric based on a maximum raw logit in the corresponding array of the first arrays of raw logits or a token metric based on the gap between the maximum raw logit and a second highest raw logit in the corresponding array of the first arrays of raw logits and (ii) one or more sequence features each indicating a characteristic of the first sequence of output tokens, and wherein generating the first set of logit metrics includes aggregating the token metrics into the one or more sequence features.

19. The system of claim 18, wherein the one or more sequence features include a total number of output tokens in the first sequence of output tokens, an overall highest maximum raw logit among the first arrays of raw logits, an overall lowest maximum raw logit among the first arrays of raw logits, an overall biggest gap between each maximum raw logit and each second highest raw logit among the first arrays of raw logits, or an overall smallest gap between each maximum raw logit and each second highest raw logit among the first arrays of raw logits.

20. The system of claim 14, wherein the confidence model is trained based on:

obtaining a plurality of training sequences and a ground truth sequence for each training sequence, wherein each training sequence includes one or more tokens, and wherein each token is associated with a corresponding array of raw logits;

generating a set of token metrics for each token in each training sequence based on the raw logits;

for each respective training sequence, aggregating the token metrics generated for the one or more tokens in the respective training sequence into one or more sequence features each indicating a characteristic of the respective training sequence;

generating a binary label for each training sequence based on a comparison of the training sequence with its corresponding ground truth sequence, wherein each binary label indicates whether the training sequence is accurate based on whether the training sequence matches its corresponding ground truth sequence;

generating training data based on the sequence features and the binary labels; and training, using the training data in conjunction with a machine learning (ML) technique, the confidence model to generate, for a given output sequence, a confidence score predictive of whether the given output sequence is accurate based on its sequence features.

* * * * *